United States Patent
Ellis et al.

(10) Patent No.: US 8,218,013 B1
(45) Date of Patent: Jul. 10, 2012

(54) STAR SENSING FOR AN EARTH IMAGING SENSOR

(75) Inventors: Kenneth K. Ellis, Churubusco, IN (US); Paul C. Griffith, Fort Wayne, IN (US)

(73) Assignee: Exelis, Inc, McLean, VA (US)

(*) Notice: Subject to any disclaimer, the term of this patent is extended or adjusted under 35 U.S.C. 154(b) by 1079 days.

(21) Appl. No.: 12/127,105

(22) Filed: May 27, 2008

(51) Int. Cl.
*H04N 5/225* (2006.01)
(52) U.S. Cl. ................................. 348/169; 348/144
(58) Field of Classification Search ............... 348/144, 348/169, 443
See application file for complete search history.

(56) References Cited

U.S. PATENT DOCUMENTS

| | | | |
|---|---|---|---|
| 4,092,670 A * | 5/1978 | Wittke | 348/169 |
| 4,746,976 A | 5/1988 | Kamel et al. | |
| 5,107,434 A * | 4/1992 | Paluszek | 701/222 |
| 6,236,939 B1 * | 5/2001 | Wu et al. | 701/222 |
| 7,349,803 B2 * | 3/2008 | Belenkii et al. | 701/222 |
| 2005/0104763 A1 * | 5/2005 | Hall et al. | 342/25 A |
| 2006/0085130 A1 * | 4/2006 | Belenkii et al. | 701/222 |
| 2008/0199077 A1 * | 8/2008 | Fowell | 382/190 |

OTHER PUBLICATIONS

C. C. Liebe, "Accuracy Performance of Star Trackers-A Tutorial", IEEE Transactions on Aerospace and Electronic Systems, vol. 38, No. 2, Apr. 2002, pp. 587-599.
R. C. Stone, "A Comparison of Digital Centering Algorithms", The Astronomical Journal, vol. 97, No. 4, Apr. 1989, pp. 1227-1237.
D. Michaels et al., "Ball Aerospace Star Tracker Achieves High Tracking Accuracy for a Moving Star Field", IEEEAC, paper #1055, Version 7, Oct. 27, 2004, pp. 1-7.

* cited by examiner

*Primary Examiner* — Phuoc Nguyen
(74) *Attorney, Agent, or Firm* — RatnerPrestia

(57) ABSTRACT

A star sensor includes (a) a scan mirror for scanning at least one star; (b) a detector array, coupled to the scan mirror, for detecting the one star; and (c) a processor, coupled to the detector array. The processor includes a first filter configured to reduce noise spikes in the detected one star, and provide a detection mask of filtered data. Also included is a second filter configured to reduce non-contiguous samples in the detection mask. A centroid calculator is included to determine a location of the one star, after the first and second filtering. The first filter includes a median filter, followed by an averaging filter, both configured to filter the one star in an along-scan direction of the scan mirror. The first filter includes another median filter, which is configured to filter the detected one star in the cross-scan direction of the scan mirror. An adder is included to subtract (a) output data from the other median filter from (b) output data from the averaging filter and provide filtered star data to the second filter.

13 Claims, 8 Drawing Sheets

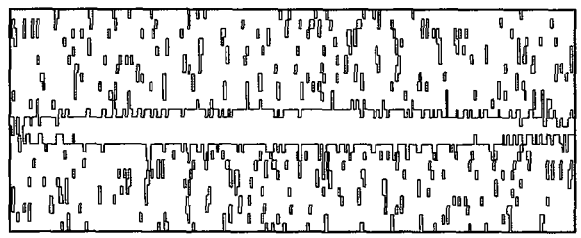
INITIAL DETECTION MASK    FIG. 6a
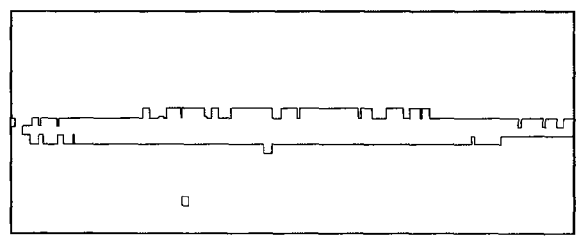
AFTER OPENING (REMOVES NOISE SPIKES)    FIG. 6b
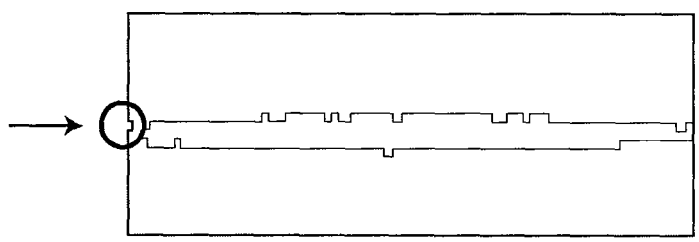
AFTER CLOSING (FILLS IN NOISE HOLES)
(NOTE 2 EXTRANEOUS BLOBS)    FIG. 6c
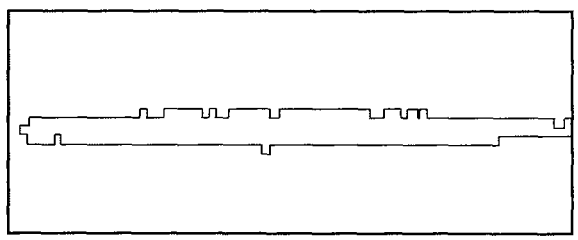
AFTER FILL/FILTER (ELIMINATE EXTRA BLOBS)    FIG. 6d

STAR SENSING FOR AN EARTH IMAGING SENSOR

STATEMENT OF GOVERNMENTAL INTEREST

The invention described herein was made in the performance of work under NASA contract no. NAS5-01119. The government has certain rights in the invention.

FIELD OF THE INVENTION

The present invention relates, in general, to a system and method for navigating using star imagery collected by a satellite-based imaging system. More specifically, the present invention relates to a system and method for detecting stars in a focal plane array (FPA) of an imager, in order to determine a line-of-sight (LOS) from a target star to each detector in the FPA.

BACKGROUND OF THE INVENTION

Star trackers may be used as attitude determination instruments onboard satellites. In essence, a star tracker is a camera connected to a microcomputer located in a satellite. Using the camera to capture a sensed image of the sky, stars may be located and identified. The orientation of the satellite may be determined based on these observations. A star tracker automatically recognizes the star patterns in the field of view (FOV) of the camera and calculates the attitude with respect to the celestial sphere being orbited by the satellite.

The performance of a star tracker depends on many parameters. For example, performance may depend on the sensitivity to starlight, the FOV, the accuracy of the star centroiding algorithm, the star detection threshold, the number of stars in the FOV, the internal star catalog and the calibration process.

Star sensors fall into two categories: scanners and trackers. Scanners have a linear array of detectors that is scanned across the sky in a direction perpendicular to the span of the array. Trackers view the sky with a 2-dimensional detector array. Both of these systems collect a 2-dimensional image of the star field, the scanner by scanning and the tracker by staring.

Most star sensing systems are dedicated to scanning or tracking the sky. They have suitable signal-to-noise (S/N) ratios and spatial resolutions, so that stars may be detected and the images may be properly centroided to provide stellar locations in focal-plane coordinates.

Dedicated star scanners/trackers typically may use a star sensing algorithm that includes the following steps:

(1) Threshold the imagery at 5 times the RMS noise level to detect the stars in the image.
(2) Center a window on each resulting detection (3×3 pixels up to 11×1 pixels, typically).
(3) Estimate the background level by calculating the average value of samples from the 1-pixel wide frame that surrounds the window and, then subtract this level from all samples in the window.
(4) Calculate the centroid of the resulting data within the window to determine the star location.

In an article, titled "Accuracy Performance of Star Trackers—A Tutorial" by Carl Christian Liebe, published by IEEE Transactions on Aerospace and Electronic Systems, Vol. 38, No. 2, April 2002, star detection is described. Liebe notes that principal contributors to the background signal noise are typically: read noise, and inhomogeneity of dark currents in the pixels. It may be possible to estimate the background noise as a standard deviation of all pixel values in a dark frame. A focal plane, which may include up to $10^6$ pixels, may set the detection threshold of a star signal to an average background pixel value plus 5 times the standard deviation to avoid false positives. A star may then be detected if the brightest pixel in the star is above the set threshold.

The brightest pixel of a star depends on a point spread function (PSF) and position of the star. As an example, if the star image has a Gaussian PSF radius of 0.5 pixels and is centered on a pixel, then approximately 29% of the signal may be contained in the brightest pixel. If the radius of the Gaussian PSF is 1 pixel and the star is centered on a boundary between 4 pixels, however, then the brightest pixel may only contain 13% of the signal, approximately.

With respect to centroiding, Liebe notes that star trackers utilize subpixel centroiding to increase accuracy. In a focused image, a star appears as a point source, so all photoelectrons from the star are generated in a single pixel. If the optics are slightly defocused, however, the star may occupy several pixels. Defocusing, thus, facilitates calculating the center of the star with subpixel accuracy.

Initially, the image may be sifted for pixels that are above a predetermined threshold. Once a pixel is detected, a region of interest (ROI) window may be centered around the detected pixel. The average pixel value on the border may be calculated and subtracted from all other pixels in the ROI.

Instruments that are dedicated to perform star tracking and require very accurate pointing knowledge do not tolerate alignment uncertainty between the instrument's focal plane array (FPA) and the star. Additional algorithms may be necessary to increase accuracy between the instrument's FPA and a line pointing to the star.

When star sensing is performed with an instrument designed for imaging the earth, however, standard algorithms may not be good enough. Because the instrument's design is driven by requirements for obtaining good earth imagery, the ability to perform star sensing may be compromised.

Further complications may arise from the fact that stars are relatively dim compared to the high albedo portions of the sunlit earth. Thus, an earth imager is typically less sensitive to dim stars than a dedicated star sensor would be. Typical integration times for an earth imager may be 1000 times shorter than those of a dedicated star tracker. Also, a limited FOV in the earth imager may place additional constraints on the available stars, and the earth imager may have to rely on dimmer stars. Thus, the signal-to-noise ratio (SNR) of star signals from the earth imager may be lower than the SNR of a dedicated star sensor.

Current algorithms may not be able to reliably detect dim stars. The simple thresholding techniques used by current algorithms do not distinguish between light from stars and spikes due to noise or cosmic rays. These algorithms, therefore, may have high false alarm rates.

The maximum detector signal from a star is variable, since the energy may be split among several detectors. The fraction of the star energy collected by a detector depends on the star's path across the detector array, which is both variable and unknown. Current algorithms may use a fixed detection threshold that is perhaps five times the RMS value of the noise. These algorithms may not be able to detect dim stars having an SNR of five or less, and may be unreliable when detecting stars with an SNR of 10 or less, due to detector signal variations from the scan geometry.

Current algorithms may calculate the centroid of the detector samples within a window of a predetermined size that is expected to include only the star of interest. There may be no certainty, however, that all the star energy falls within this window. In addition, the inclusion of detector samples that contain little or no signal, skews the results and diminishes the accuracy.

Furthermore, the accuracy of current centroiding techniques may be diminished by noise spikes and may be completely destroyed when including pixels from nearby stars.

Scattered light in the optics or in the atmosphere may introduce background gradients in the detected data, depending on the relative positions of the star, earth, moon and sun. The background gradients may bias the star centroid, degrading accuracy for line-of-sight (LOS) angles that are relatively far from the sun (even 20-30 degrees away). This limits the stars that may properly be centroided with current algorithms.

The present invention addresses the above deficiencies and provides a solution to each one, as described below.

SUMMARY OF THE INVENTION

To meet this and other needs, and in view of its purposes, the present invention provides a star sensor including (a) a detector array for viewing at least one star and outputting star data; (b) a median filter configured to reduce spikes in the outputted star data and provide first filtered star data; (c) an averaging filter configured to low-pass filter the first filtered star data and output second filtered star data. A calculator is included for determining a location of the one star in the detector array, based on the second filtered star data.

The median filter includes a one row by three columns (1×3) median filter in the along-scan direction of the detector array. The averaging filter includes a one row by at least 12 columns (1×12) averaging filter in the along-scan direction of the detector array. The averaging filter may be a moving averaging filter configured to move by one column in the one row, in order to average-filter another at least 12 columns in the along-scan direction of the detector array.

The present invention may include another median filter configured to remove noise in the cross-scan direction, and provide third filtered star data. A summer is configured to subtract the third filtered star data from the second filtered star data and provide fourth filtered star data.

The present invention may include an adder for sequentially adding adjacent rows of the fourth filtered star data and provide the adjacent added rows to the calculator. A threshold module may be configured to output portions of the fourth filtered star data in response to a user defined detection threshold, where the outputted portions of the fourth filtered star data is provided as a detection mask to the calculator.

The calculator may include a 1×3 binary opening module and a 1×3 binary closing module configured to receive the detection mask and output reduced non-contiguous detected samples in the detection mask. A multiplier is configured to provide a product of the fourth filtered star data with the outputted reduced non-contiguous detected samples. A centroid calculator is included for estimating a centroid position of the product outputted from the multiplier to obtain the location of the one star.

In another embodiment of the present invention, a star sensor includes a scan mirror for scanning at least one star; a detector array, coupled to the scan mirror, for detecting the one star; and a processor, coupled to the detector array for executing various algorithms. The processor includes (a) a first filter configured to reduce noise spikes in the detected at least one star, and provide a detection mask of filtered data; (b) a second filter configured to reduce non-contiguous samples in the detection mask, and (c) a centroid calculator configured to determine a location of the at least one star.

The first filter includes a median filter, followed by an averaging filter, where both filters are configured to filter the detected one star in the along-scan direction of the scan mirror. The first filter includes another median filter configured to filter the detected one star in the cross-scan direction of the scan mirror. An adder is configured to subtract (a) output data of the other median filter from (b) output data from the averaging filter to provide filtered star data to the second filter. A threshold module is configured to provide the detection mask to the second filter after thresholding the filtered star data. A multiplier is configured to provide a product of (a) the filtered star data and (b) the detection mask. The data provided from the multiplier is sent to the centroid calculator.

The star sensor may include a star identification (ID) verifier, coupled to the centroid calculator, for verifying the location of the one star.

In yet another embodiment of the present invention, a method of sensing a star includes the steps of: (a) receiving scanned image data of at least one star; (b) filtering the scanned image data in the along-scan direction to provide along-scanned image data; (c) further filtering the scanned image data in the cross-scan direction to provide cross-scanned image data; (d) subtracting the cross-scanned image data from the along-scanned image data to provide filtered star data; and (e) calculating a centroid location of the at least one star, based on the filtered star data.

Step (b) includes median-filtering the scanned image data to provide first filtered data, and next, average-filtering the first filtered data to provide the along-scanned image data. Step (c) includes median-filtering the scanned image data to provide the cross-scanned image data. The method further includes the steps of: after subtracting in step (d), thresholding the subtracted data to provide a detection mask; and forming a product of the filtered star data and the detection masks. The formed product is used by the calculating in step (e).

The method of the present invention may include the step of: verifying the centroid location calculated in step (e) based on data from a star catalog.

It is understood that the foregoing general description and the following detailed description are exemplary, but are not restrictive, of the invention.

BRIEF DESCRIPTION OF THE FIGURES

The invention may be understood from the following detailed description when read in connection with the accompanying figures:

FIG. 6a through 6e are examples of images of a star, taken at various stages of filtering, in accordance with an embodiment of the present invention.

DETAILED DESCRIPTION OF THE INVENTION

As will be explained, the present invention overcomes sensitivity of star detection to noise by applying median and averaging filters to the detected data, in order to eliminate noise spikes and reduce noise. These median and averaging filters permit dim stars to be detected with a higher probability and a lower false alarm rate than conventional star sensing techniques.

As will also be explained, the present invention overcomes background and stray light effects by estimating a background gradient from a median filter used for filtering each column in the detector array and, then, subtracting the filtered column from the same column belonging to a previously averaged row in the detector array.

Other advantages of the present invention, as will be explained, include the following:

The present invention overcomes the problem of dividing star signals between detectors. This may be accomplished by adding signals in adjacent rows of the detector array.

The present invention achieves robust performance, although it may use a fixed detection threshold. This may be accomplished by combining background estimation and subtraction with added signals of adjacent rows of the detector array.

The present invention reduces loss of centroiding accuracy due to extraneous pixels (containing either noise or nearby stars) by applying spatial filtering operations to select only samples that are contiguous with the brightest sample, and smoothing the edges of the sampled region.

The present invention reduces loss of centroiding accuracy caused by adding together adjacent detector signals. This may be accomplished by centroiding the sampled data values that are obtained prior to adding together the signals of adjacent detectors.

Figure 1:
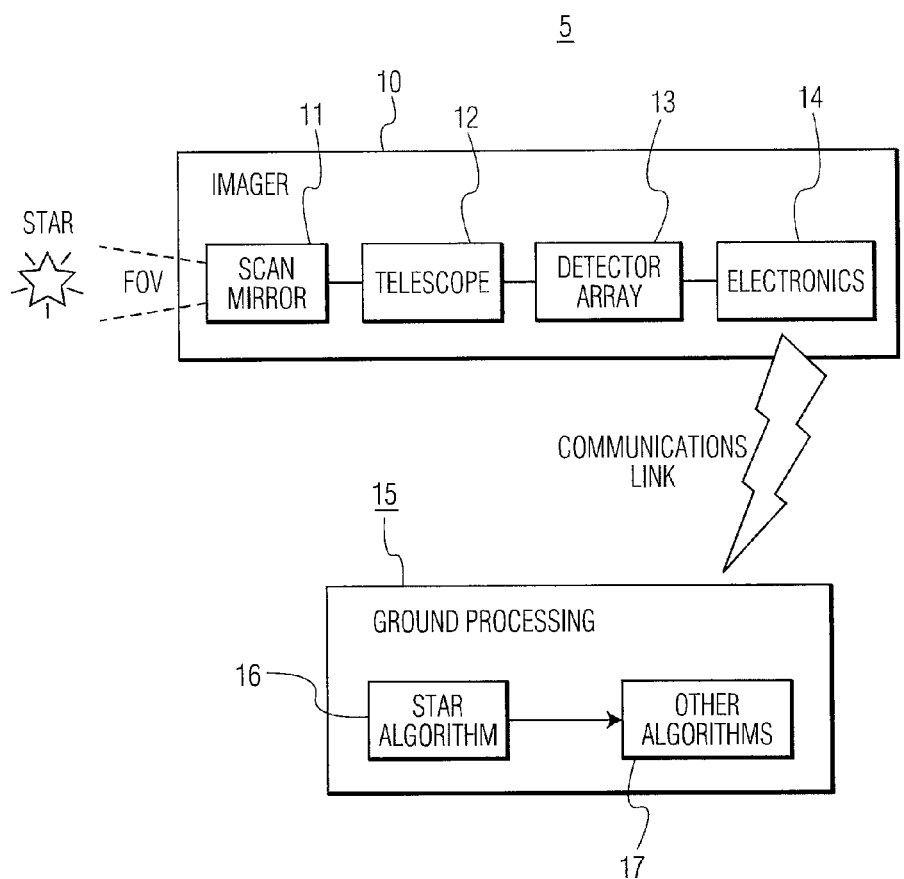
FIG. 1 is a functional block diagram of a star sensor, in accordance with an embodiment of the present invention.

Referring first to FIG. 1, there is shown a star sensing system, generally designated as 5. As shown, star sensing system 5 includes imager 10, which resides in a satellite orbiting a celestial body (such as the earth), and ground processing station 15, which is located on the ground. Imager 10 includes scan mirror 11, telescope 12, detector array 13 and communication electronic modules 14. The ground processing station 15 may include star algorithm(s) 16 and other algorithms 17.

Scan mirror 11 may be mounted on a two-axis gimbal, which selectively positions the scan mirror in the along-scan and cross-scan axes (east/west and north/south, respectively). The scan mirror may move to locate and scan across a predetermined star known from a star catalog. The star catalog may be stored in memory (not shown).

The telescope 12 receives the light arriving from scan mirror 11 and forms an image on detector array 13. The image(s) may include star light and unwanted scattered light. Various electronic modules, designated as 14, may be provided for amplifying and digitizing the detected image(s) to form star data for transmission to ground processing station 15. The star data may contain unwanted noise generated by the random arrival rate of the photons and the detector electronics noise sources. The electronic modules 14 may also include the communications, command and control required for downlinking detected star data to ground processing station 15. The electronic modules 14 may also include compression algorithms for compressing detected star data to achieve compatibility with bandwidth limitations of the communications link.

In addition to other algorithms, designated as 17, the ground processing station may include various algorithms, described later in detail, but shown in FIG. 1 simply as star algorithm 16. It will be appreciated, however, that the star and other algorithms 16, 17 may reside in electronic modules 14, which is shown located in imager 10 residing in the satellite. Accordingly, the present invention is not limited to the functional block sequence shown in FIG. 1.

A single star measurement may include using scan mirror 11 to point a line-of-sight (LOS) closely to a predicted star location and scan the star with a portion of a visible or an IR detector array, such as detector array 13. The initial location may be calculated from an attitude signal provided by the satellite. During star data collection, attitude rate information from the satellite may be used to compensate for satellite motion, thereby permitting a reduction in the time required to collect the star data.

The detectors of detector array 13 may be sampled at a high rate relative to the scanning rate of scan mirror 11, so that several hundred samples of a star may be collected in the scan direction. This allows for filtering the background noise without any corresponding loss in centroid accuracy of the detected star.

For star sensing, the present invention does not need to collect star data from the entire detector array. The present invention may select only a portion of the detector array that includes contiguous good detectors and then use the scan mirror to center that portion of the detector array on the predicted star location.

There may be times when the satellite's motion more than offsets the orbital motion, effectively resulting in a scan away from the target star. A possible solution provided by the present invention may be to use the scan mirror to compensate for the satellite's motion based on attitude rate data received from inertial navigation systems in the satellite.

By way of example, a compensation signal may be generated from the last known satellite's attitude. This signal may be converted to an equivalent scan mirror shaft angle, and the shaft angle with an integral value of the converted . satellite's attitude rate may be used to update the shaft angle. In addition, a look up table may be uploaded once per day with compensation terms for diurnal, thermal and orbit errors. Thus, by applying motion compensation terms to the motors of the scan mirror, the present invention ensures that the detectors drift across the star at the sidereal rate.

Figure 2:
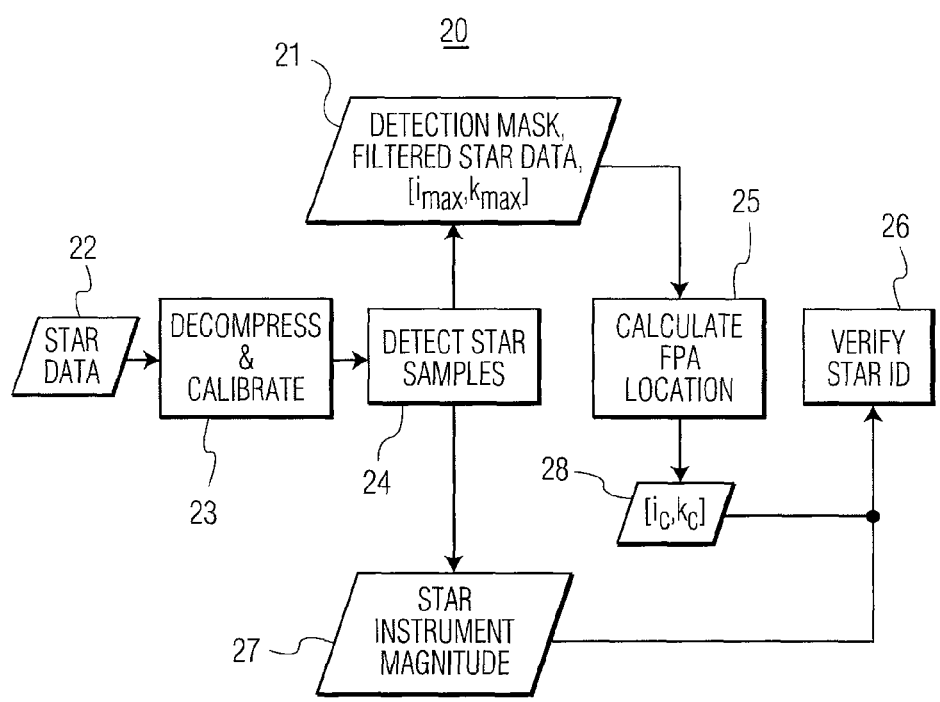
FIG. 2 is a block diagram depicting an exemplary process flow of an algorithm for detecting star samples and calculating a location of the detected samples in a focal plane array (FPA), in accordance with an embodiment of the present invention.

Turning next to FIG. 2, there is shown an exemplary star sensing algorithm, designated as 20, which may be executed by a computer or microcomputer residing in ground processing station 15 or in imager 10 (located in the satellite). Alternatively, the algorithm may be executed by a computer or microcontroller located in the satellite, but residing externally of imager 10.

As shown, star sensing algorithm 20 may include decompression and calibration module 23, star sample detector 24, FPA location calculator 25 and star ID verifier 26. It will be appreciated that input and output signals are shown as rhombuses for the following:

(a) input of star data 22;

(b) outputs/inputs of detection mask, filtered star data, and pixel location of the maximum intensity detector sample $[i_{max}, k_{max}]$, collectively designated as 21;

(c) output/input of a pixel location of the desired star for tracking or staring $[i_c, k_c]$, designated as 28; and (d) output/input of the value of the maximum intensity star. located at [$i_{max}$, $k_{max}$], referred to herein as star instrument magnitude 27.

It will be understood that the decompression portion of decompression and calibration module 23 may be required, if star data 22 is compressed for downlink to ground processing station 15. If the star sensing is performed on-board the satellite, however, compression and decompression of star data 22 may not be necessary.

The calibration portion of decompression and calibration module 23 may include any process that removes variations in amplitude gains and offsets from digital counts recorded by the detectors. Typically, calibration may be accomplished by converting digital counts into radiance units. Calibration may be accomplished, for example, by viewing targets of known high and low radiances and determining a linear function that relates the known radiances to the digital counts. Calibration may also be necessary to ensure performance is not degraded by sensor artifacts.

After decompression and calibration of star data 22, the star samples detector 24 provides various filters configured to median-filter and average-filter the star data. The manner in which the star samples detector provides such filtering will be described later with respect to FIG. 3. The star samples detector 24 provides several output data to FPA location calculator 25. These output data 21 include a detection mask, filtered star data, and a location of the maximum intensity detector sample. Another output, namely star instrument magnitude 27 may be provided to star ID verifier 26. This star instrument magnitude may be saved for later star verification by star ID verifier 26.

As will be explained with respect to FIG. 4, FPA location calculator 25 receives the detection mask, the filtered star data, and the location of the maximum intensity signal located in the image and calculates a location of a target star for tracking purposes. The output location of the target star, namely [$i_c$, $k_c$] is shown designated 28 in FIG. 2. This output location may be compared to a known location of the desired star from the star catalog, in order to verify the identification (ID) of the target star.

Figure 3:
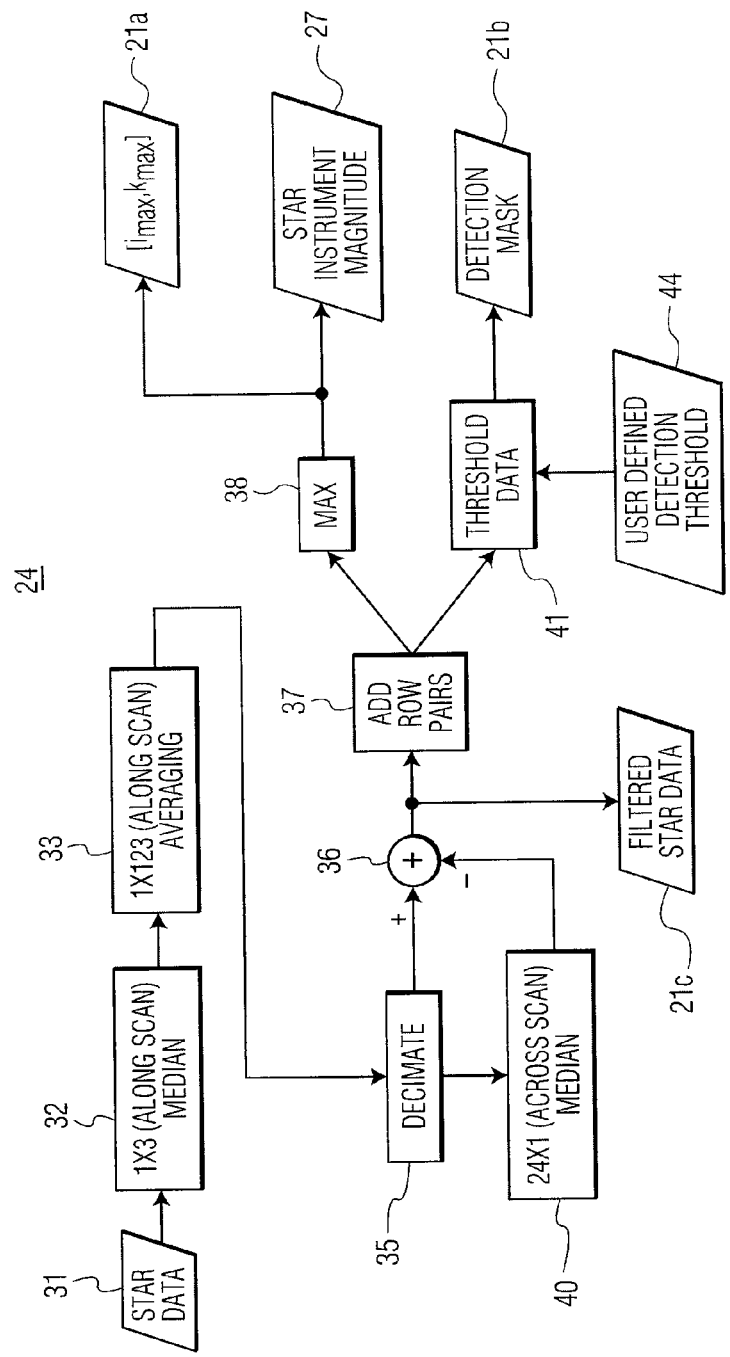
FIG. 3 is an exemplary flow diagram depicting more detail of the process for detecting star samples shown in FIG. 2, in accordance with an embodiment of the present invention.

Referring next to FIG. 3, the star sample detector, designated as 24 (same as star sample detector 24, shown in FIG. 2) will now be described. The star sample detector may include 1×3 median filter 32, averaging filter 33, 24×1 median filter 40 and decimator 35. Additional functions that may be included, as shown, are summer 36, row pair adder 37, MAX module 38 and thresholding module 41.

Star data 31 may include data from each of the detectors (or pixels) selected for star sensing. These may be data from the entire detector array 13 (FIG. 1) or only a portion of the detector array. Each of the detectors selected for star sensing may be sampled rapidly, while the LOS of the mirror slowly scans across the sky, forming a data set having many samples of the star (or stars) in the East-West direction (direction of drift), also referred to herein as the along-scan direction.

Figure 5A:
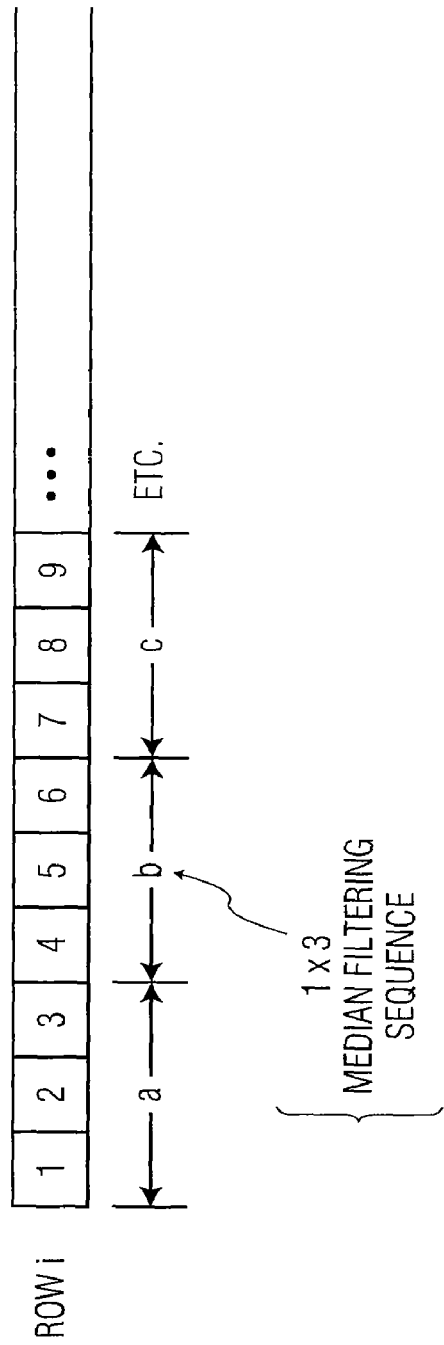
FIG. 5*a* is an example of a 1×3 median-filtering sequence, in accordance with an embodiment of the present invention.

The star data 31 may first be filtered by 1×3 median filter 32 in the along-scan direction. It will be understood that 1×3 designates an array of 1 row by 3 columns of pixels (or detector samples). Because cosmic ray and noise spikes tend to be only one sample wide, these may be removed from the star data using 1×3 median filter 32. This 3-sample median-filtering may be performed by successively finding the median intensity of the 3 samples, as shown in FIG. 5a. As shown, the pixels in row i may be sampled three columns at a time, until all the pixels in row i have been sampled (for example a, b, c, etc.). When filtering of row i is completed, the 1×3 median filter may similarly sample the next row, and so on, until the entire data set (for example, an entire detector array) has been filtered.

Figure 5B:
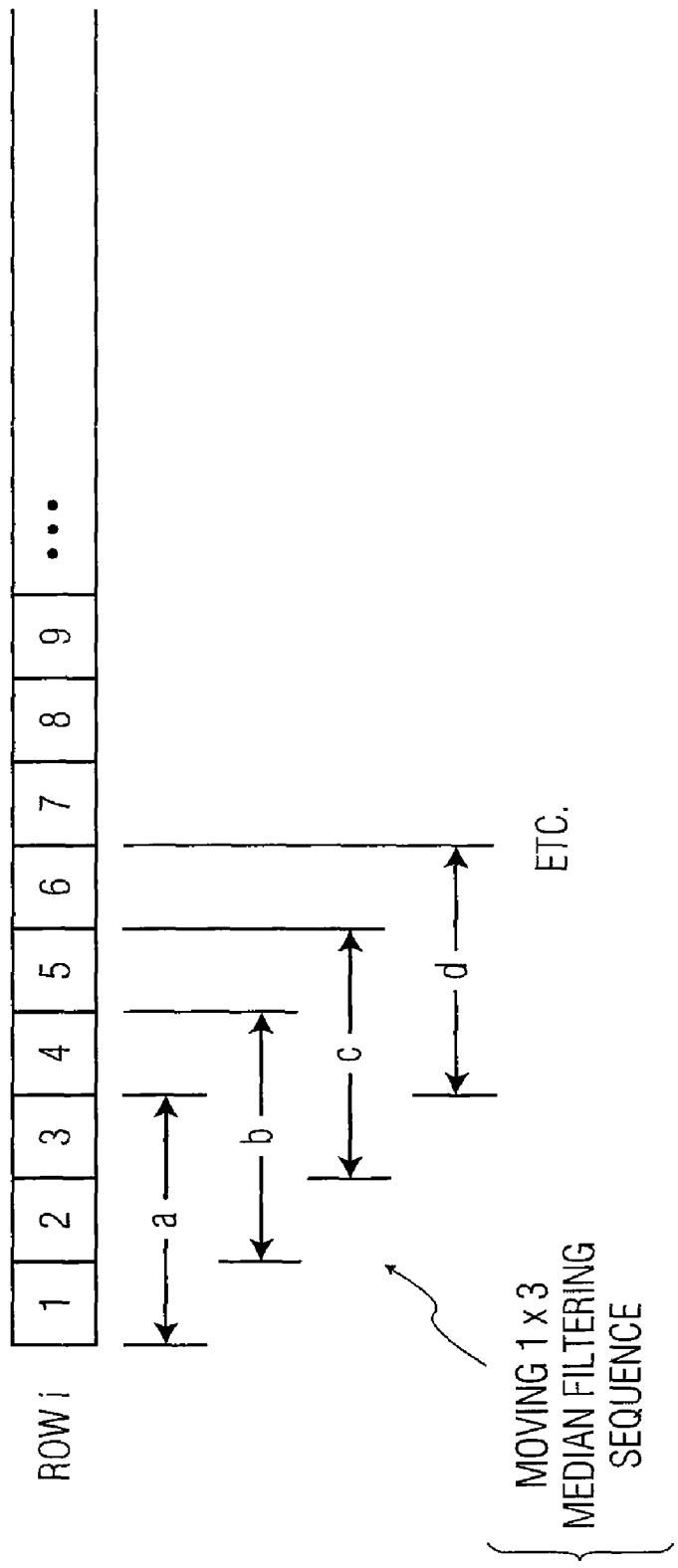
FIG. 5*b* is an example of a moving 1×3 median-filtering sequence, in accordance with an embodiment of the present invention.

As another example of a 1×3 median filter, contemplated by the present invention, there is shown a moving 1×3 median-filtering sequence (a, b, c, d, etc.) in FIG. 5b. As shown, during sequence a, pixels, 1, 2, 3 are sampled; during sequence b, pixels 2, 3, 4 are sampled; during sequence c, pixels 3, 4, 5 are sampled; and so on.

After completing the 1×3 along-scan median-filtering for the entire selected portion of detector array 13 (FIG. 1), the present invention may perform a 1×123 along-scan average-filtering. As previously described with respect to FIGS. 5a and 5b, average filter 33 may perform a 1×123 along-scan average-filtering using a moving average-filtering or simply a successive, non-moving average-filtering.

Since the star profiles are slowly varying, the present invention may use the 1×123 average filter 33 as a low-pass-filter to reduce the noise. The present invention may accomplish the low-pass-filtering by applying a moving average window. The width of the window may be selected to maximize the SNR of the filtered data.

It will be appreciated that the sequence process of first median-filtering (filter 32) and, secondly average-filtering (filter 33) results in a more accurate estimate of the true value of the star data, thereby improving performance. The averaging window may move 10 samples between steps to effectively decimate the data (as performed by decimator 35).

In FIG. 3, the window size is given as 123 samples wide, but both this window size and the decimation interval may have any value and may be chosen to optimize the SNR, while minimizing the amount of data processed in any subsequent steps.

Another median filter, designated as 40, may be used by the present invention to median-filter the columns of the desired array portion of detector array 13. This filtering is performed in the cross-scan direction (perpendicular to the along-scan direction). As an example, 24×1 median-filter 40 is shown in FIG. 3, denoting 24 rows of data in a single column.

As previously described with respect to FIGS. 5a and 5b, the 24×1 cross-scan median-filtering may include a moving-median, or simply a successive, non-moving median. The example of median filter 40, shown in FIG. 3, includes 24 detectors to sample the sky, but this number may be another number of detectors that adequately covers the star search area.

After decimation by decimator 35 in the along-scan direction, and after 24×1 median-filtering by filter 40 in the cross-scan direction, summer 36 (actually a subtraction module) subtracts the median of each column output by median filter 40 from the column values output by averaging filter 33. This is performed in order to remove any along-scan background gradients. The output of summer 36 includes a set of filtered star data, shown designated as 21c.

In order to obtain a more uniform star signal when the star image may be split between detectors, adjacent rows of the data may be added by the present invention using row-pair adder 37. For example, rows 1 and 2 may be summed, rows 2 and 3 may be summed, rows 3 and 4 may be summed, etc.

The resulting filtered and row-paired star data may be compared to threshold 44 (which may be determined by a user from the required probability of detection (PD), probability of false alarm (PFA) and noise level). All star data samples that exceed predetermined threshold 44 may be declared to be valid star samples by thresholding module 41. The output map of these valid star samples from module 41 is referred to herein as the detection mask, designated as 21b.

An example of detection mask 21b is shown in FIG. 6a. It will be appreciated that the star data are highly over-sampled in the along-scan direction, so that when the star data is displayed in image format, as shown in FIG. 6a, the star appears to be horizontally elongated rather than circular.

A module for determining the maximum intensity star in the filtered and row-paired star data is shown designated as MAX module 38. The MAX module 38 provides the maximum filtered star signal as star instrument magnitude 27, which may be saved for later star verification. The pixel location $[i_{max}, k_{max}]$ of the maximum filtered star signal may also be saved for use in further filtering the detection mask, prior to locating the star. The pixel location of $[i_{max}, k_{max}]$ may be provided as an output signal to fill and filter module 43 (FIG. 4), shown designated as output 21a.

Figure 4:
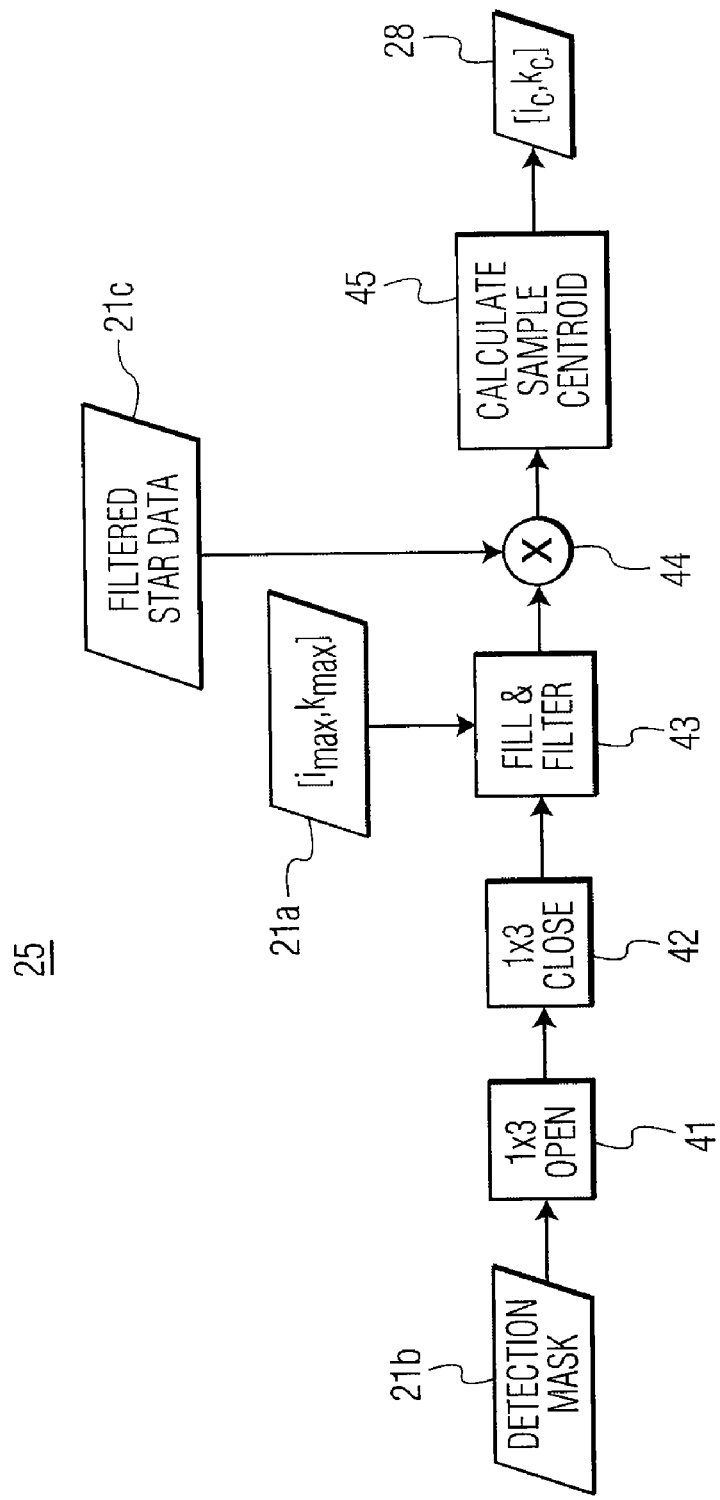
FIG. 4 is an exemplary flow diagram depicting more detail of calculating the location of the detected star samples in the FPA shown in FIG. 2, in accordance with an embodiment of the present invention.

Referring now to FIG. 4, there is shown greater detail of the FPA location calculator 25 (shown in FIG. 2). As shown in FIG. 4, FPA location calculator 25 may include 1×3 opening module 41, 1×3 closing module 42, fill and filter module 43, multiplier 44 and sample centroid calculator 45. As also shown, the location of $[i_{max}, k_{max}]$ 21a, detection mask 21b, and filtered star data 21c may be provided as input data. The output data shown in the figure, namely the centroid location of the star, $[i_c, k_c]$, is designated as 28.

Still referring to FIG. 4, and describing it as a flow diagram, the present invention first applies 1×3 along-scan binary opening and closing operations to detection mask 21b. These operations reduce non-contiguous detected samples and fill in single sample holes in the detection mask. These operations ensure that samples close to the threshold value do not skew the final centroid calculations (performed by module 45).

An opening operation reduces positive spikes in the data having widths on the order of 1×3 pixel size (for example). Structures in the signal that are larger than some kernel value may be unchanged in size. A closing operation, on the other hand, fills in negative spikes that may be the size of the kernel and leaves larger structures unchanged in size.

In more detail, opening and closing operations may be related to morphology, which is a branch of image processing using nonlinear operations to extract shape, size and texture information from a signal. Opening and closing operations are analogous to convolution operations. They use a kernel (a "structuring element") that is tailored to alter a signal in a desired manner. Like convolution, this morphological kernel has a "center" which is placed on the pixel of interest. The value of this pixel in the output image is determined by a nonlinear combination of the kernel values and the pixel values.

The opening and closing operations may use any size or shape kernel. A 1×3 structuring element is used herein as an example.

Figure 7:
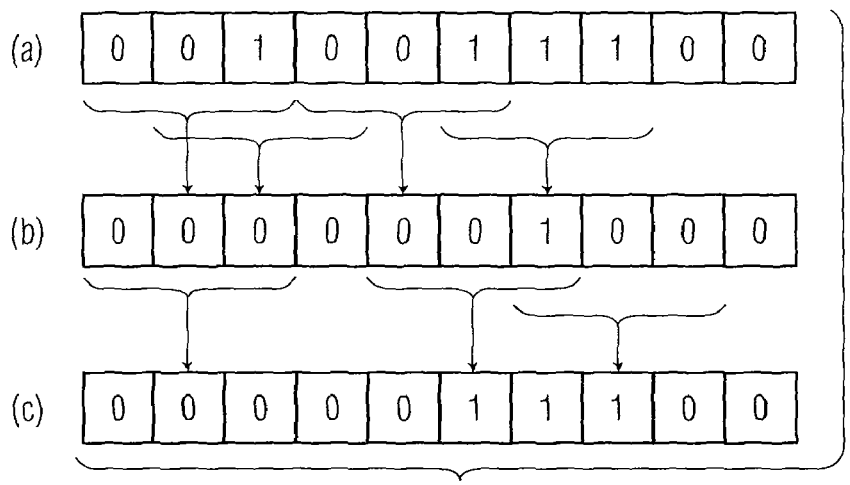
FIG. 7 is an example of a binary opening operation.

In binary opening and closing operations the values of the pixels are either "1" or "0". Furthermore, an opening operation involves morphologically, first erosion and secondly dilation. Erosion in binary is an AND operation on input samples; and dilation in binary is an OR operation on input samples. An example of an opening operation is shown in FIG. 7. The pixels in row (a) may be considered as an input to an erosion operation (or AND operation). A 1×3 sliding window (a window moving over by one pixel, for example) may be applied to the input data (row a), where 3-pixels are shown AND-ed together. The output from the erosion operation is shown as the pixels in row (b).

Next, the pixels in row (b) may be considered as an input to a dilation operation (or an OR-ing operation). Another sliding window (window moving over by one pixel, for example) may be applied to the input data (row b), where 3-pixels are shown OR-ed together. The output from the dilation operation is shown as the pixels in row (c).

Examining FIG. 7, it may be seen that a binary opening operation removes 1 pixel wide noise spikes and retains features that are 3 pixels wide. After applying a binary opening operation to the detection mask (FIG. 6a), an image may result as shown in FIG. 6b. Accordingly, most spikes seen in the detection mask may be removed.

Figure 8:
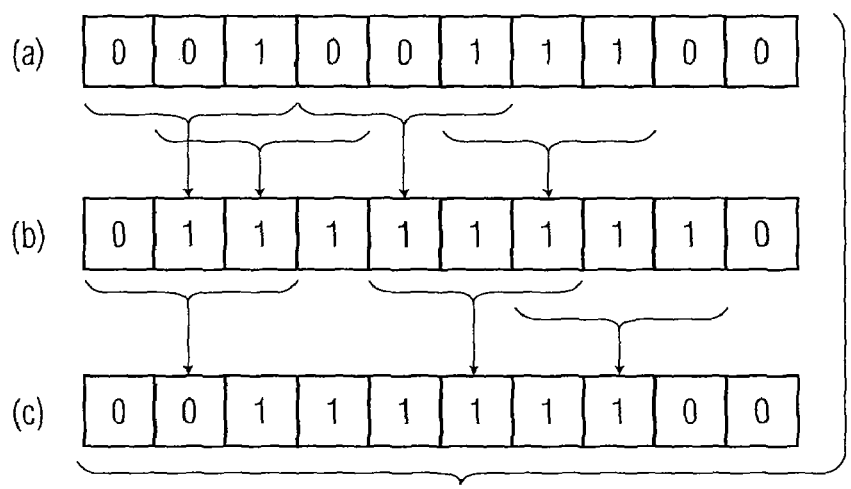
FIG. 8 is a example of a binary closing operation.

Next, a closing operation will be described. A closing operation involves morphologically first dilation and secondly erosion. An example of a closing operation is shown in FIG. 8. The pixels in row (a) may be considered as an input to a dilation operation (or an OR operation). A sliding window (window moving over by one pixel, for example) may be applied to the input data (row a), where 3-pixels are OR-ed together. The output from the dilation operation is shown as the pixels in row (b).

Next, the pixels in row (b) may be considered as an input to an erosion operation (or an AND-ing operation). Another sliding window (window moving over by one pixel, for example) may be applied to the input data (row b), where 3-pixels are AND-ed together. The output from the erosion operation is shown as the pixels in row (c).

Examining FIG. 8, it may be seen that a binary closing operation fills in noise holes. Applying a binary closing operation, after the opening operation shown in FIG. 6b, results in an image shown in FIG. 6c. Accordingly, most noise holes may end up being filled.

Returning to FIG. 4, the present invention first applies 1×3 binary opening and closing operations (modules 41 and 42) to the detection mask, as an example. These operations may reduce non-contiguous detected samples and may fill in single sample holes in the detection mask. This ensures that samples close to the threshold do not skew the later performance of centroid calculator 45.

It will be appreciated that it is possible to obtain more than one detected blob in the star data. This may be due to a noise burst or to a nearby star that exceeds the detection threshold. A bright object avoidance criteria may be used by the present invention to ensure that the target star is the brightest object in the collected field. Median and moving average filtering in the detection algorithm of the invention makes it less likely that a noise burst will exceed the target star signal. However, it may still be possible that noise or dimmer stars will exceed the detection threshold and produce additional blobs in the detection mask. Since the maximum sample value is likely produced by the target star, the present invention may use the maximum sample value as a seed to fill the detection blob. Any remaining blobs may be discarded.

Figure 6E:
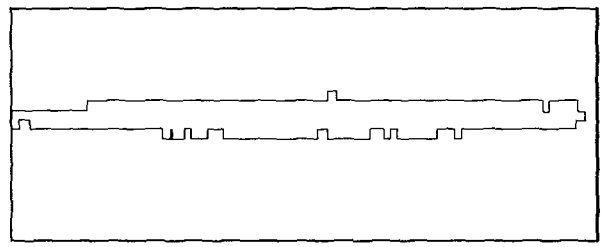

Accordingly, fill and filter module 43 may be used by the present invention, as shown, with the maximum sample value located at $[i_{max}, k_{max}]$ 21a as a seed to fill the detection blob. After filling and filtering by module 43, exemplary output data is shown in FIG. 6d (the input data is the image shown in FIG. 6c). It will be appreciated that the extra 2 blobs in image 6c are eliminated in image 6d. A final example of a detection blob outline laid over a photographic negative of the star intensity image is shown in FIG. 6e.

Next in the flow process, multiplier 44 multiplies filtered star data 21c with the resulting detection mask outputted from module 43 to obtain star sample intensities that exceed the detection threshold. Note that the filtered star data is the data prior to adding the adjacent detector samples together (as shown in FIG. 3). Next, module 45 calculates the centroid of these valid samples to determine the location ($k_c$) of the star blur spot in the focal plane array coordinates $[i_c, k_c]$. Note that since the array is scanning in the i direction but is oriented along the k direction, $i_c$ corresponds to the time at which the star is centered on the detector and $k_c$ corresponds to the cross-scan location of the star on the array at that time. The output location $[i_c, k_c]$ of the target star is designated 28, as shown in FIG. 4.

There are many centroiding algorithms that may be used by the present invention, including but not limited to thresholding, windowing, correlation, quad-cell, and first-moment calculations. Regardless of which centroiding algorithm may be selected, the performance of the selected algorithm is enhanced by the processing steps of the present invention.

Having detected and located the target star, the measured magnitude of the target star at position $[i_{c, kc}]$ 28 may be compared with predicted values. Accordingly, the measured position at $[i_c, k_c]$ may be compared with the FPA coordinates predicted for the target star. If the difference between the measured and the predicted positions is too large, the star may be rejected as the target star.

The maximum star signal may also be compared to the predicted instrument magnitude of the star. If the difference exceeds the accuracy of the measurement (for example, three times the RSS of the RMS measurement precision and RMS prediction precision), the star may be rejected as the target star. The comparison may be made by star ID verifier 26 (FIG. 2), using input data of the magnitude at $[i_{c, kc}]$ location 28 and the star instrument magnitude 27.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention. For example, the present invention may be used in the following additional applications:
  (a) Detecting point targets with a scanning sensor in a noisy environment;
  (b) Detecting transient point targets with a staring sensor in a noisy environment;
  (c) Wave-front sensing/Adaptive optics;
  (d) Stellar photometry and astrometry; and
  (e) Optical link acquisition systems.

Wavefront sensing includes estimating the shape of the phase of an optical beam and using this information to compensate for aberrations and improve the imaging performance of an optical system. There are various methods for accomplishing wavefront sensing. One of them, known as Hartmann-Shack, includes placing a lenslet array over a detector array and using the locations of the resulting focused spots (one spot for each lenslet) to estimate the tilt of the phasefront as a function of location.

It will be appreciated that the process of determining the focused spot locations is analogous to determining the location of a star during star sense. Thus, the present invention may be used to improve performance of wavefront sensors, or any other sensor used for determining the location of a focused spot of light.

Stellar photometry requires accurate spatial integration of light received from a star and, at the same time, it requires reducing noise and unwanted background. In addition, star intensity measurements need to be less dependent on the position of the star image relative to the detector centers. The present invention may be used to better position the star image and to reduce noise and unwanted background.

Astrometry requires determining an accurate star location and processing stellar images with accurate centroiding algorithms. The present invention may be used to improve star detection and location in astrometry.

Optical link acquisition systems locate the source of a laser beam and use that information to point both a receiving sensor and an illuminating transmitter at the laser beam source (see for example U.S. Pat. No. 6,469,815). Like star sensing, this may be considered a point-source detection and location problem. Like star scanning systems, optical link acquisition systems are scanned across the detector array, although in optical link acquisitions sysytems it may be the source that scans, not the receiver. The present invention may be used to improve optical link acquisition systems.

What is claimed:

1. A star sensor comprising
a detector array for viewing at least one star and outputting star data,
a first median filter configured to reduce spikes in the outputted star data, and provide first filtered star data,
an averaging filter configured to low-pass filter the first filtered star data and output second filtered star data,
a second median filter configured to filter the second filtered star data in the cross-scan direction of the scan mirror,
an adder configured to subtract (a) output data from the second median filter from (b) output data from the averaging filter to provide third filtered star data, and
a calculator for determining a location of the at least one star in the detector array, based on the third filtered star data,
wherein the first median filter includes a one row by three columns (1×3) median filter in the along-scan direction of the detector array, and
the averaging filter includes a one row by at least 12 columns (1×12) averaging filter in the along-scan direction of the detector array.

2. The star sensor of claim 1 wherein
the averaging filter is a moving averaging filter configured to move by one column in the one row, in order to average-filter another at least 12 columns in the along-scan direction of the detector array.

3. The star sensor of claim 2 wherein
the averaging filter is configured to sequentially average-filter at least 60 columns in the along-scan direction of the detector array, and
a decimator is coupled to the averaging filter and configured to decimate the sequential at least 60 columns in the along-scan direction of the detector array and, subsequently, provide the second filtered star data.

4. The star sensor of claim 1 further comprising
a threshold module configured to output portions of the third filtered star data in response to a user defined detection threshold,
wherein thresholded portions of the third filtered star data is provided as a detection mask to the calculator.

5. The star sensor of claim 4 wherein the calculator includes
a 1×3 binary opening module and a 1×3 binary closing module configured to receive the detection mask and output reduced non-contiguous detected samples of the detection mask,
a multiplier configured to provide a product of the third filtered star data with the outputted reduced non-contiguous detected samples, and
a centroid calculator for estimating a centroid position of the product outputted from the multiplier to obtain the location of the at least one star.

6. A star sensor comprising
a scan mirror for scanning at least one star,
a detector array, coupled to the scan mirror, for detecting the at least one star, and
a processor, coupled to the detector array, including
(a) a first filter configured to reduce noise spikes in the detected at least one star, and provide a detection mask of filtered data,
(b) a second filter configured to reduce non-contiguous samples in the detection mask, and
(c) a centroid calculator configured to determine a location of the at least one star,
wherein the first filter includes a median filter, followed by an averaging filter, both filters configured to filter the detected at least one star in an along-scan direction of the scan mirror, and
the first filter includes another median filter configured to filter the detected at least one star in a cross-scan direction of the scan mirror, and
an adder configured to subtract (a) output data from the other median filter from
(b) output data from the averaging filter to provide filtered star data to the second filter.

7. The star sensor of claim 6 further comprising a threshold module configured to provide the detection mask to the second filter, after thresholding the filtered star data, and
a multiplier configured to provide a product of (a) the filtered star data and (b) the detection mask,
wherein data provided from the multiplier is sent to the centroid calculator.

8. The star sensor of claim 6 further comprising
a star identification (ID) verifier, coupled to the centroid calculator, for verifying the location of the at least one star.

9. A method of sensing a star comprising the steps of:
(a) receiving scanned image data of at least one star;
(b) filtering the scanned image data in the along-scan direction to provide along-scanned image data;
(c) further filtering the scanned image data in the across-scan direction to provide cross-scanned image data;
(d) subtracting the cross-scanned image data from the along-scanned image data to provide filtered star data; and
(e) calculating a centroid location of the at least one star, based on the filtered star data;
wherein a first median filter includes a one row by three columns (1×3) median filter in the along-scan direction of the detector array; and
an averaging filter includes a one row by at least 12 columns (1×12) averaging filter in the along-scam direction of the detector array.

10. The method of claim 9 wherein
step (b) includes median-filtering the scanned image data to provide first filtered data, and
next, average-filtering the first filtered data to provide the along-scanned image data.

11. The method of claim 9 wherein
step (c) includes median-filtering the scanned image data to provide the cross-scanned image data.

12. The method of claim 9 further including the steps of:
after subtracting in step (d), thresholding the subtracted data to provide a detection mask; and
forming a product of the filtered star data and the detection mask;
wherein the formed product is used by the calculating in step (e).

13. The method of claim 9 including the step of:
verifying the centroid location calculated in step (e) based on data in a star catalog.

* * * * *